United States Patent [19]

Zappia

[11] Patent Number: 5,408,051
[45] Date of Patent: Apr. 18, 1995

[54] SUN SHIELD FOR AERIAL CABLE

[76] Inventor: John Zappia, 278 Mary Lou, Yonkers, N.Y. 10703

[21] Appl. No.: 96,423

[22] Filed: Jul. 26, 1993

[51] Int. Cl.$^6$ ............................................. H01B 7/28
[52] U.S. Cl. ................................... 174/135; 174/41; 174/136
[58] Field of Search ............... 174/135, 40 R, 41, 136; 191/30, 31, 35

[56] References Cited

U.S. PATENT DOCUMENTS

| | | | |
|---|---|---|---|
| 1,647,065 | 10/1927 | Vaughan et al. | 191/35 |
| 1,967,134 | 7/1934 | Short | 174/41 |
| 2,812,380 | 11/1957 | Lehrke | 174/41 |
| 3,772,451 | 11/1973 | Canavan et al. | 174/41 |
| 4,159,395 | 6/1979 | Cogelia | 174/41 |
| 4,262,169 | 4/1981 | Lanton, Jr. | 174/41 X |
| 4,994,630 | 2/1991 | Schilling | 174/41 |

FOREIGN PATENT DOCUMENTS 1599927  10/1990  U.S.S.R. ............................ 174/40 R

Primary Examiner—Leo P. Picard
Assistant Examiner—Hyung S. Sough
Attorney, Agent, or Firm—Martin J. Spellman, Jr.

[57] ABSTRACT

The failure of the joints of electric power cables due to heating from incident sunlight is greatly reduced by providing a special sun shield for the joint. The sun shield is comprised of a plastic body having an inverted semi-circular transverse cross section. A longitudinal recess on the inner surface of the body centrally located at the top of the cross section is dimensioned so as to fit over the carrier wire. The sides of the body extend downwardly to shield the cable joint from incident sun light and preferably have a plurality of perforations to allow cool air to circulate between the shield and the cable joint. The shield has a reflective outer surface.

2 Claims, 1 Drawing Sheet

SUN SHIELD FOR AERIAL CABLE

BACKGROUND OF THE INVENTION

1. Field of the Invention

The present invention relates to a SUN SHIELD FOR AERIAL ELECTRIC CABLES which are supported by carrier wires and more especially to cable joints which tend to develop high operating temperatures. Such higher operating temperatures often lead to failure of the joint and interruption of service to the customers. Such joints have increased resistance and thus increased operating temperatures over those of the surrounding cable. Temperatures are a major factor in cable joint failures, particularly where there are minor imperfections in the joint itself. Utilization of the shield of the present invention reduces such joint failures since with the shield the joint often runs at a cooler temperature than the surrounding cable when exposed to extremely hot or bright sunlight.

2. Prior Art

U.S. Pat. No. 1,647,065 Vaughan discloses a guard for a trolley wire which is intended to prevent persons in tunnels or mines from accidentally touching the wire with their heads when their wire is in a low position such as in low parts of mines, tunnels and the like. This wire guard patent regards, comprises an inverted trough shaped member made of rubber coated canvas. The is secured to the wire by bolts which pass through the top center and depend from the guard the bolts carry clamping plates and additional bolts clamp the plates on the wire. The bolts are insulated from the carrier itself. This guard does not serve to shield an electric cable from the heat of the sun to prevent contact by persons with the cable.

SUMMARY OF THE INVENTION

The failure of the joints of electric cable used in electric distribution systems during summer months due to overheating of the cable joints by the heat of the sun rays produces significant outages interrupting customer services. These cables are carried by utility poles and are generally suspended by straps from a carrier wire over the electric cable. The cable joints are usually jacketed with plastic. Such joints are usually about 4 feet long and 3" or 4" to 10" inches in diameter. Because of the increased resistance of the joint, it typically runs significantly hotter than the cable itself. When such joints are exposed to hot sunrays, the heat of the sun raises the temperature even higher and, especially in the case of joints having minor imperfections, the increased temperatures often result in the failure of the joint-the blowing out of the joint and the resulting interruption of customer service.

It is of great importance to utility companies to minimize the number of such outages by trying to insure that such joints are made as perfectly as possible with the minimum of imperfections which would increase the temperature or otherwise lead to a breakdown of the joint. Up to the present time, there has been no effective shield for these joints to effectively minimize the effect of the incidence of sun increasing the temperatures of these joints.

According to the present invention there is provided a sun shield for aerial electric cable. This simple design is easily installed, and allows a flow of clean air around the cable joint and escape of any warm air as well as blocking incident sun rays and reflecting the rays away from the surface of the shield itself. According to the present invention, there is provided a cable shield having a semi-circular transverse crossection, a reflective outer surface, apertures for allowing the circulation of cooling air, and a longitudinal recess at the top of the shield for placing the shield over carrier wire, a slot midway down each side at each end for receiving a strap that goes around the carrier wire and over the top of the shield which strap may be tightened to secure the shield to the carrier wire. The shield usually is ⅛" to ¼" thick.

Perforations approximately ⅜ inch in diameter are formed in the shield to allow a circulation of air from the space between the joint and the shield. The shield itself is preferably made of plastic approximately ⅜" in thickness. Suitable materials are celcon, polyethylene, polytetrafluorethylene and the like. The plastic itself may be colored a light color such as white in order to reflect the incident sun rays on the outer surface. Preferably the shield is coated with a reflective substance on its outer surface.

Installation of the shield of the present invention over aerial cable joints greatly reduces the running temperature of the joint particularly in bright sunlight. In most cases, in bright sunlight, the effect of this shield is that the running temperature of the joint is less than that of the surrounding cable. This decrease in the running temperature of the joint thus greatly diminishes the incidence of outages due to failure of the cable joint caused by overheating.

BRIEF DESCRIPTION OF THE DRAWING

In the accompanying drawing which forms a part of this specification.

ILLUSTRATIVE SPECIFIC EMBODIMENT

Figure 1:
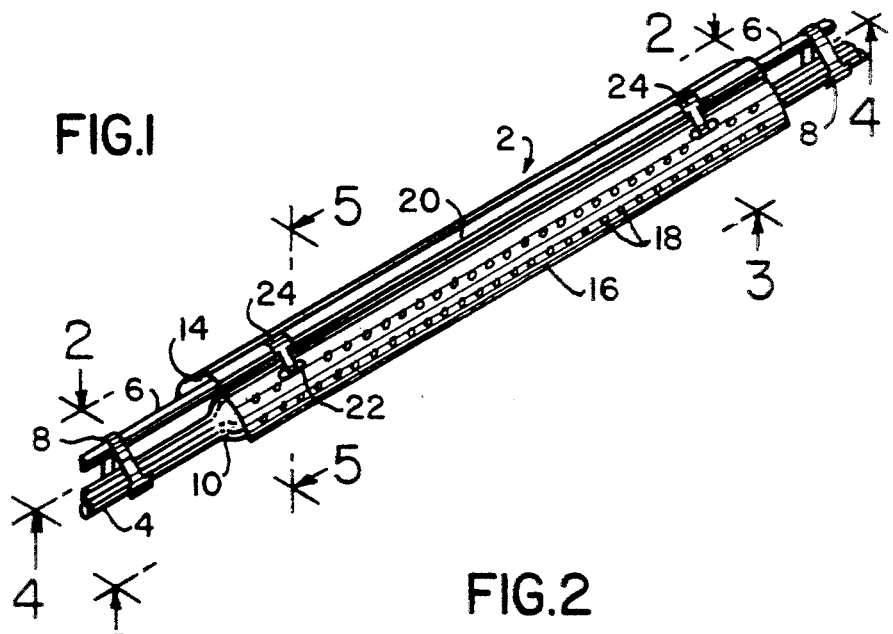
FIG. 1 is a perspective view shown in the cable joint cover of the present invention in place over an electric cable joint and the cable carrier wire.
Figure 2:
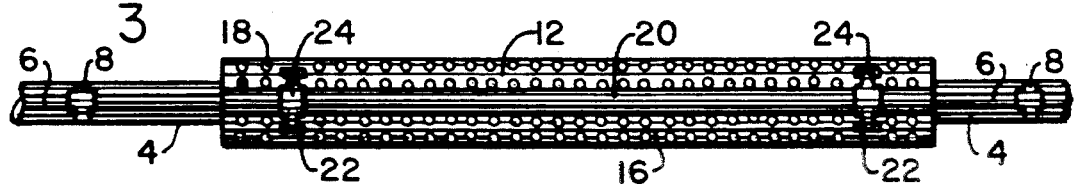
FIG. 2 is a top view of the cover carrier wire and cable shown in FIG. 1.
Figure 3:
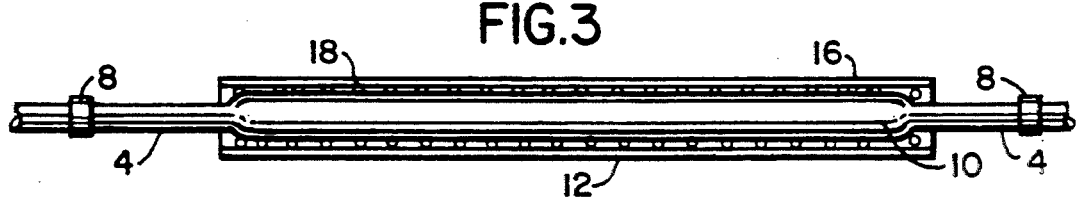
FIG. 3 is a bottom view along lines 3—3 of FIG. 1.
Figure 4:
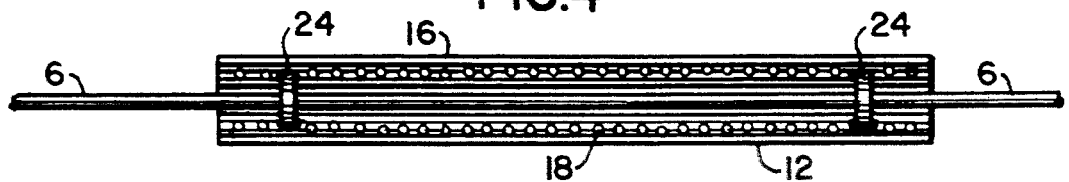
FIG. 4 is the bottom view taken along lines 4—4 of FIG. 4.
Figure 5:
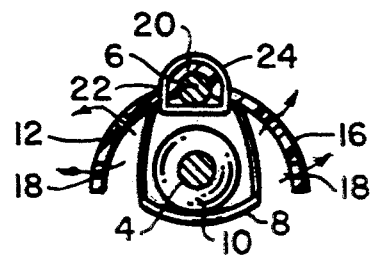
FIG. 5 is a section view taken along lines 5—5 of FIG. 1.

Referring to the accompanying drawing, the protective shield 2 of the present invention is shown over the cable 4 which is carried by the wire carrier 6 to which it is secured by conventional straps 8. The cover 2 is in place over the pull joint 10. The cover comprises a plastic body 12 of semi circular crossection as first shown in FIG. 5 and as indicated the outer or upper surface thereof is covered with a light reflecting coating. Each descending side 14 and 16 of the body 12 extends downward sufficiently to lock incident sun rays from striking the cable splice 10. The body 12 is designed to be slightly longer than the splice 10. The sides 14 and 16 of the cover 12 have rows of perforations or apertures 18 served to provide for the circulation of air around the joint 10. The top of the body 12 has an inverted u-shaped hump in it dimensions so as to fit snugly around a carrier wire 6 to retain the body 12 in place. The plastic carrier straps 24 pass through openings 22 on opposing sides 14 and 16 at each end of the body 12 so that the straps may be tightened around the hump 20 to hold the body 12 in place around the carrier cable 6. As indicated, the body 12 is comprised of a molded plastic having a sun reflecting coating on the outer surface. Typical of materials that may be used are reflective paints and foil wraps.

The perforations 18 are usually about ⅜" in diameter.

It has been found that the installation of the cable joint shield according to the present invention substantially reduces instances of splice or joint failures due to over heating of the joint because of sunray heating.

While the invention has been described by reference to an illustrative embodiment, it is not intended that the novel device be limited thereby, but that modifications thereof are intended to be included as falling within the broad spirit and scope of the foregoing disclosure, the following claims and the appended drawings.

What is claimed is:

1. A sun shield for an electric cable joint wherein said cable is suspended beneath a carrier wire, said sun shield comprising a single body having an inverted semicircular transverse cross section, said body extending longitudinally from a first end to a second end, a longitudinal recess on the inner surface of said body centrally located at the top of said cross section and dimensioned so as to fit over said carrier wire, first and second sides of said body extending downwardly to shield said cable joint from incident sunlight said body having a plurality of perforations and securing means to secure said shield to said carrier wire over said joint.

2. A shield as claimed in claim 1 wherein said body is comprised of plastic and has a reflective outersurface.

* * * * *